United States Patent [19]
Ziph-Schatzberg

[11] Patent Number: 5,748,225
[45] Date of Patent: May 5, 1998

[54] CONDITION SENSITIVE METHOD AND APPARATUS FOR IMAGING A LITHOGRAPHIC PRINTING PLATE

[75] Inventor: Leah Ziph-Schatzberg, No. Andover, Mass.

[73] Assignee: Agfa Division, Bayer Corporation, Wilmington, Mass.

[21] Appl. No.: 414,393

[22] Filed: Mar. 31, 1995

[51] Int. Cl.[6] ..................................................... B41J 2/47
[52] U.S. Cl. .................................................. 347/262
[58] Field of Search ................................ 347/133, 262, 347/264

[56] References Cited

U.S. PATENT DOCUMENTS

| | | | |
|---|---|---|---|
| 4,989,039 | 1/1991 | Hayashi et al. | 347/133 |
| 5,471,313 | 11/1995 | Thieret et al. | 347/133 |
| 5,552,818 | 9/1996 | Agano et al. | 347/133 |

Primary Examiner—Mark J. Reinhart
Attorney, Agent, or Firm—Julie A. Krolikowski

[57] ABSTRACT

A platesetting method and apparatus provides for dimensional and/or exposure sensitivity changes in a printing plate to be imaged in a platesetter. A condition sensor senses the temperature of the plate prior to exposure so that a control unit can adjust the control commands to the scanning exposure mechanism of the platesetter in order to compensate for any thermal expansion or exposure sensitivity shifts. An image to be recorded onto the plate material has a standard size at a standard plate material temperature. When the plate material is at a non-standard temperature, as determined by the thermal sensor, a program, stored in memory, calculates a new image size based on the non-standard temperature and the thermal characteristics of the plate material which are also stored in memory. The imagesetter electronic controller then exposes an image having a size which will be the standard size when the plate material returns to the standard temperature.

36 Claims, 3 Drawing Sheets

CONDITION SENSITIVE METHOD AND APPARATUS FOR IMAGING A LITHOGRAPHIC PRINTING PLATE

BACKGROUND OF THE INVENTION

In electronic prepress systems, digital images are processed in a rasterization image processor (RIP) and output onto film, paper, plate, or other image receiving materials by imagesetters, digital proofers, printers, platesetters, and other such output devices. When outputting color separations or other slices or layers of a digital image to be subsequently superimposed together, geometric accuracy and repeatability is highly desirable. However, fluctuations in ambient operating conditions of the output device and condition sensitive characteristics of the image receiving material render a repeatable output difficult to attain. The operating conditions tend to vary in temperature and humidity which can result in thermal expansion and moisture absorption in the material, and can also effect the exposure sensitivity of the emulsion coating on the material. Thermal expansion and moisture absorption before imaging causes the overall size of the output image to appear larger or smaller than the digital image delivered from the RIP when the material returns to its original condition after imaging. Shifts in the exposure sensitivity can over expose or under expose the output image. These changes to the material can cause noticeable misregistration for separations which are run in different operating conditions, even from the same output device.

To obtain accurate and repeatable output from typical output devices, separation are usually done consecutively from the same output device. Some output devices are equipped with temperature and/or humidity control systems to ensure consistent output. With imagesetting conditions controlled, output of separations may be more accurate, even when run at different times. However, such control systems usually are offered as an upgrade option and add considerable expense to an output device.

Accordingly, it is a general object of the invention to achieve repeatable output of a digital image from an output device such as an imagesetter, digital proofer, or platesetter.

It is an object of the invention to provide an improved digital image output device with a system for correcting for varying operating conditions that effect condition sensitive characteristics of an image receiving material used in the output device.

It is a specific object of the invention to compensate for thermal expansion and contraction of an image receiving material in a digital image output device to output a consistent image size.

It is a specific object of the invention to compensate for thermal expansion and contraction of an image receiving material in a digital image output device to output a consistent image size.

It is a specific object of the invention to compensate for moisture absorption of an image receiving material in a digital image output device to output a consistent image shape.

Platesetters are particularly sensitive to misregistration problems due to output operating conditions. The image receiving material in a platesetter is a plate material onto which a color separation of an image is directly exposed, subsequently processed, and then mounted directly onto a press cylinder of a printing press. Inaccuracies in image size and exposure levels increase make-ready time on the press and increase material waste. It is therefore an object of the invention to output separations of a digital image onto a plate material from a platesetting device consistent in overall size and exposure levels when mounted on a printing press.

SUMMARY OF THE INVENTION

A method and apparatus according to the invention produces a repeatable output image on an image receiving material from digital image data. The method comprises sensing the condition of an image receiving material to be imaged with a digital image, adjusting the output of the digital image according to the condition of the image receiving material to compensate for changes of condition sensitive characteristics of the image receiving material, and outputting the digital image on the image receiving material in accordance with the adjusted output. The invention is applicable wherein the conditions are temperature and humidity and the condition sensitive characteristics are geometric size, shape, and exposure sensitivity of the image receiving material.

One aspect of the invention is related to outputting the digital image on the image receiving material. This includes scanning an exposure beam on the image receiving material while modulating the exposure beam according to the digital image data, and adjusting the exposure level of the exposure beam according to the temperature of the image receiving material to compensate for shifts in exposure sensitivity of the image receiving material.

Another embodiment of the invention includes scanning the exposure beam on the image receiving material while modulating the exposure beam according to the digital image data, and adjusting the modulation frequency and/or scanning speed of the exposure beam in accordance with the surrounding conditions to compensate for changes in geometric size and shape of the image receiving material.

DETAILED DESCRIPTION OF THE INVENTION

Figure 1:
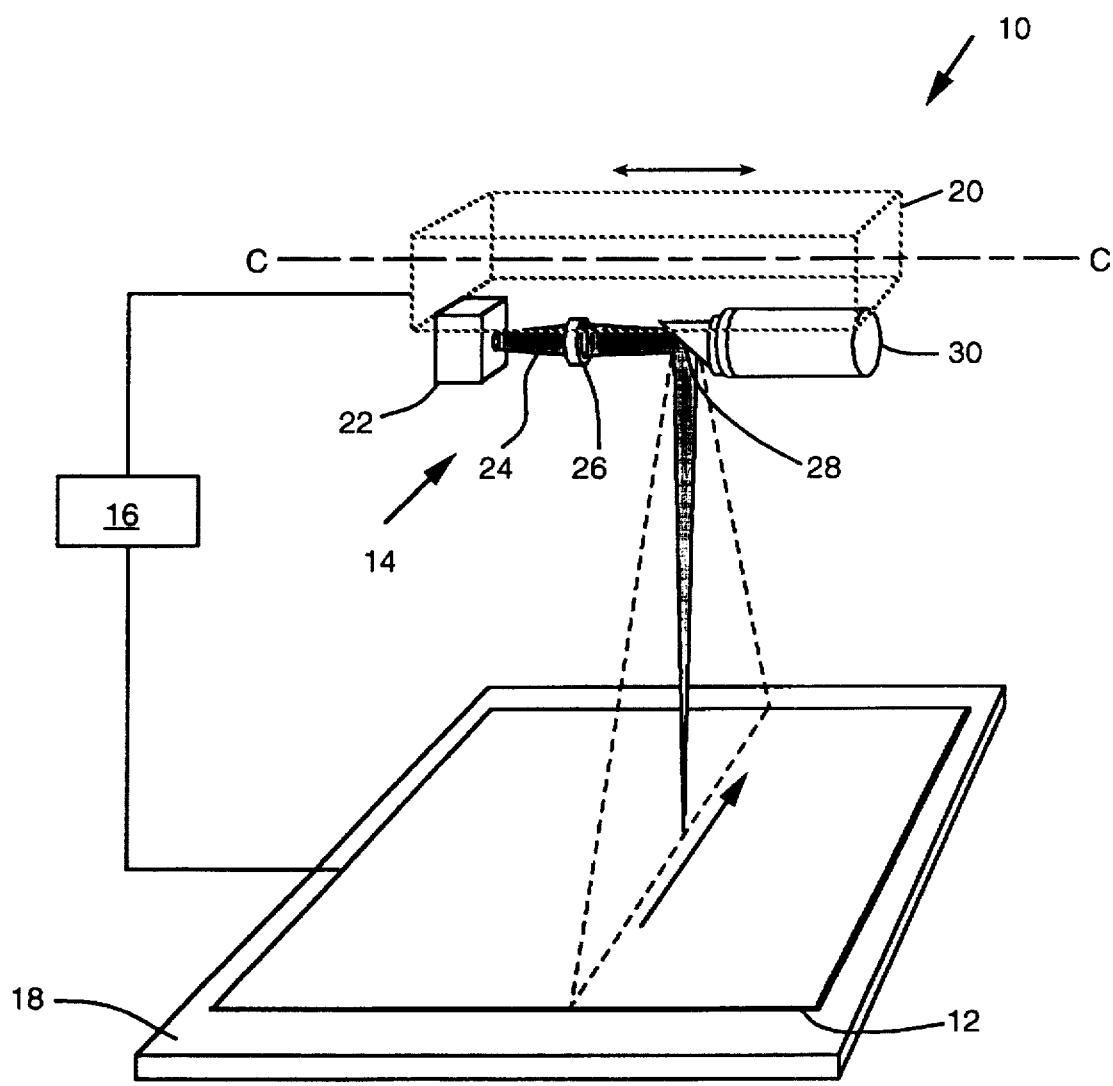
FIG. 1 is an isometric view of an output device such as a platesetter having a condition sensitive control unit according to the invention.

Referring to FIG. 1, an output device generally indicated by reference numeral 10 is shown for outputting a digital image onto an image receiving material 12. The output device 10 comprises a scanning mechanism generally indicated by reference numeral 14, a control unit 16, and a material support 18. The scanning mechanism is mounted to a carriage 20 which travels linearly in the slow scan direction along axis C—C, to provide relative movement between the carriage 20 and the material support 18. An exposure beam source 22 generates an exposure beam 24 that is directed through a focus lens 26 onto a beam deflector 28, which deflects the beam 24 to the image receiving material 12. The beam deflector 28 is rotated by a spin motor 30 to scan the beam 24 in the fast scan direction across the image receiving material 12 while the exposure beam source 22 is modulated according to the digital image data supplied to the output device control unit 16 from a RIP (not shown in FIG. 1). The motion of the carriage 20 along the axis C—C is synchronized with the spin motor 30 to line-wise scan the modulated beam 24, producing the output image on the receiving material 12.

Figure 2:
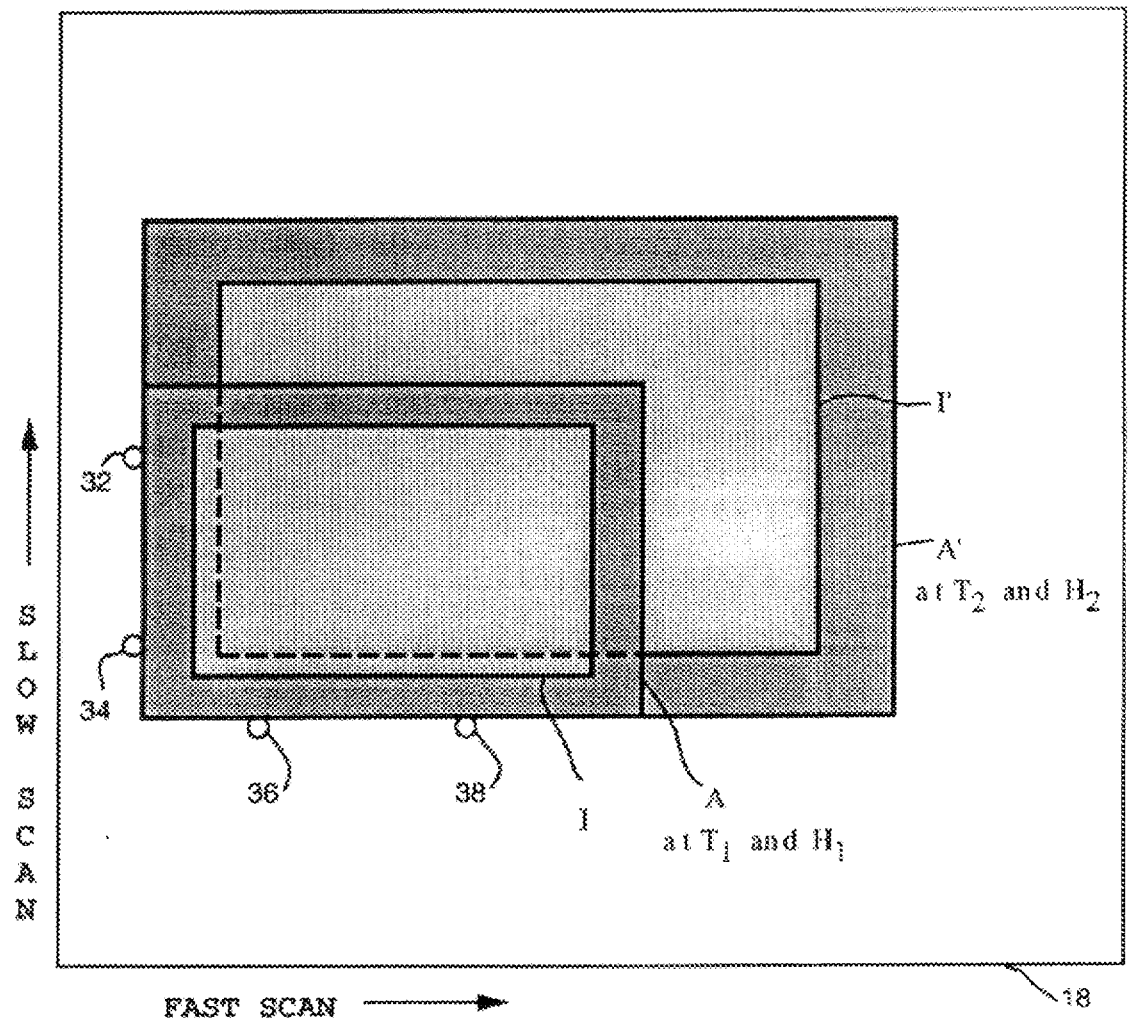
FIG. 2 is an exaggerated illustrative view depicting a condition sensitive characteristic of an image receiving material and resulting output of the output device as in FIG. 1 according to the present invention.

Shown in FIG. 2 is an example of thermal expansion of an image receiving material in the preferred printing plate form according to the invention. Plate A is at temperature $T_1$ and humidity $H_1$ and is shown supported on the material support 18 and is registered with respect thereto by four reference points 32–38. The registration system can be electronic or mechanical as such systems are known in the art for positioning each plate in a known position with respect to the material support and the scanning mechanism. Plate A has an image area I representing the size of the image to be output to the plate according to the digital image data. Thermally expanded plate A' is at temperature $T_2$ and humidity $H_2$ and is also shown (exaggerated for illustrative purposes) having a corresponding expanded image area I'. The expanded image area I' represents the size of the output image for the expanded plate A'. Plate A and thermally expanded Plate A' are the same image receiving material but have different geometric sizes due to a difference in their respective temperatures and/or humidities. The controller unit 16 determines the output size in a manner to be described hereinafter, to ensure that the size of the output image is consistent for a plate at a predetermined temperature, regardless of the temperature of the plate during exposure by the scanning mechanism 14. Ideally, the plate remains in register with respect to the reference points 32–38 whether thermal expansion occurs before, during, or after loading the plate onto the material support 18. FIG. 2 shows the plate registered with respect to two edges of the plate. However, the plate can be registered by other methods such with the center of the plate along a center axis of the material support.

Figure 3:
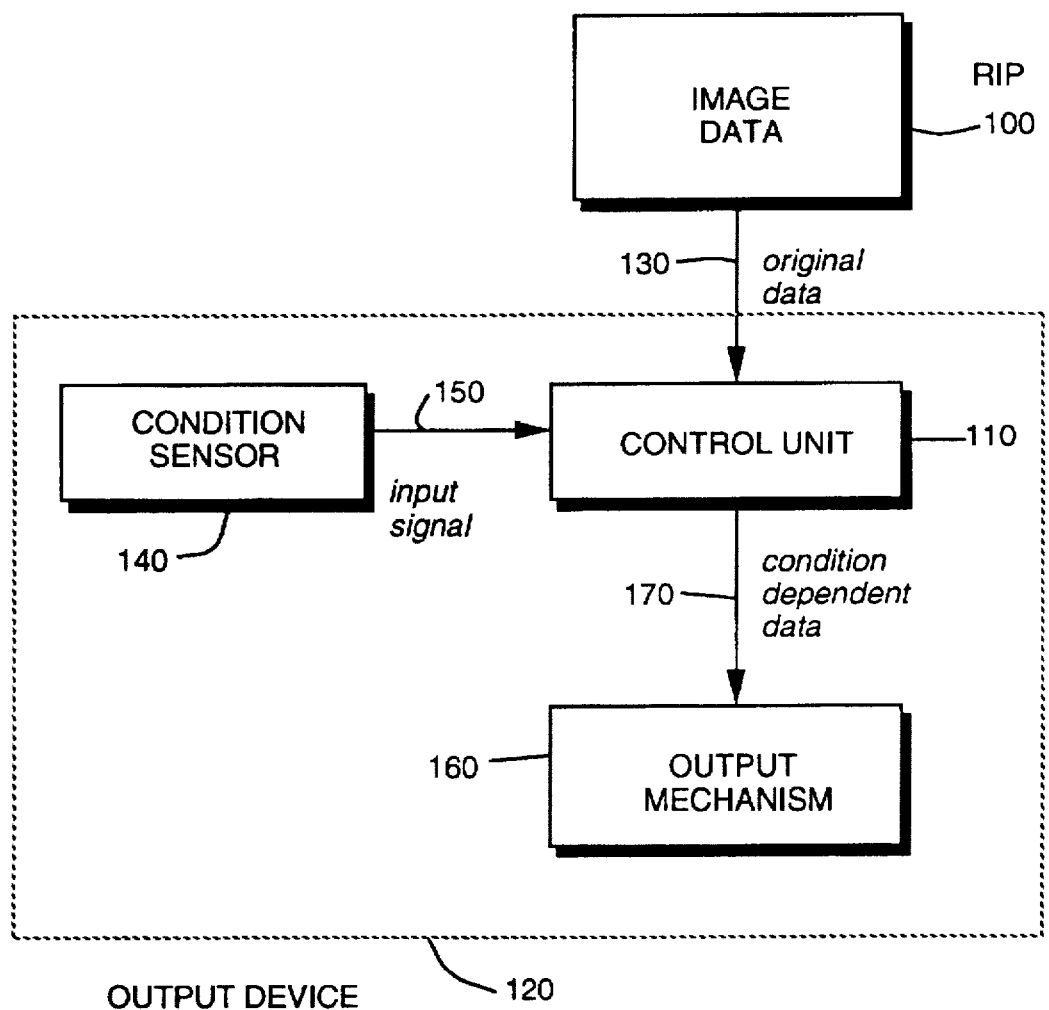
FIG. 3 shows a block diagram depicting a RIP and the output device according to the present invention.

Referring to FIG. 3, the method for determining the size of the output image is illustrated in a block diagram. A RIP 100 delivers image data to the control unit 110 of the output device 120 as original data 130. The output device 120 is a platesetter according to the preferred embodiment of the invention. A condition sensor 140 internal to the output device 120 senses the temperature of the plate and sends an input signal 150 to the control unit 110 indicating the temperature of the plate. The control unit 110 is programmed to adjust the size of the output image according to the temperature of the image plate and the coefficient of thermal expansion of the plate material, given by the equation $a'=(1\, dL)/(L\, dT)$ where $a'$ denotes the coefficient of expansion, L length of the plate material, A area, and T temperature. The equations for expansion in length and area are given by $\Delta L = a'L\Delta T$, and $\Delta A = 2a'A\Delta T$ for linear expansion of a homogeneous material. (It will be appreciated that non-linear expansions are taken into consideration and the above formulas are given as an example and are not intended to limit the invention.) As there are standard plate sizes and materials typically used in the platesetter, the expanded plate sizes within a temperature range can be calculated for each standard plate size and material, and programmed into the memory of the control unit. The input signal 150 from the condition sensor 140 directs the control unit 110 to "look-up" the temperature dependent output size for the plate size in use at the sensed plate temperature. The control unit 110 then delivers control commands to the output mechanism 160 as condition dependent data 170, the output mechanism 160 being the scanning mechanism 14 shown in FIG. 1 according to the preferred embodiment of the invention.

The scanning mechanism 14 is normally controlled by the control unit 16 which generates a pixel clock signal for several standard plate sizes at several standard resolutions. The pixel clock signal synchronizes the modulation of the exposure beam 24 and the slow scan and fast scan motors driving the carriage 20 and the beam deflector 28, respectively. For a known standard plate size and a selected output resolution, the pixel clock generates a standard number of pixels per scan line and scan lines per plate, covering the entire standard plate area. To increase the output image size for an expanded plate, the pixel clock frequency is adjusted to spread out the pixels, thereby lengthening the scan line in the fast scan direction and increasing the spacing of the scan lines in the slow scan direction to cover the area of the expanded plate, such as for a plate A' expanded in both the fast scan and slow scan directions in FIG. 2. The beam intensity can also be adjusted to account for spacing changes between scan lines. The pixel clock control commands are combined with the original data 130 from the RIP 100 and delivered to the scanning mechanism 14 as the condition dependent data 160. The resulting output image is uniformly expanded according to the plate temperature and the coefficient of thermal expansion of the plate at the instant of imaging. The position of the image with respect to the plate can be contained in the original data 130, and therefore the output image position and size with respect to the plate remain proportional, as exemplified in FIG. 2.

More frequently the plate expands rather than contracts before imaging as described in the above example. However, it will be understood that decreasing the output image size for a thermally contracted plate is accomplished in a similar manner. It will be appreciated that the material support can support the material is a variety of configurations other than the planar support illustrated in FIG. 2. Other support configurations can be cylindrical in form, such as capstan type supports and internal and external drum supports. Further the support can be of a virtual type configuration rather than a surface.

Some lithographic printing plates chance sensitivity as a function of temperature in a predictable manner. Others can be affected as a function of humidity. The present invention compensates for these condition sensitive characteristics by adjusting the output level of the exposure beam according to the temperature and/or humidity sensed by the condition sensor, thereby preventing over or under exposure of the plate due to changes in the exposure sensitivity. The sensitivity thresholds for certain materials shift in a known manner as a function of temperature and/or humidity. Therefore, the control unit can be programmed with a "look-up" table of information for the various types of plates used in the output device. Then the correct exposure level is "looked-up" by the control unit when an input signal from the condition sensor is received. The control unit delivers the control commands to the scanning mechanism with the condition dependent data, to adjust the power output of the exposure beam source according to the sensitivity threshold for the plate in use at the sensed plate condition. It will be appreciated that the condition dependent data may compensate for thermal expansion of the plate, as heretofore described, in addition to changes due to shifts in exposure sensitivity.

Some materials such as aluminum, tend to expand uniformly and linearly along length and width axes, according to the coefficient of thermal expansion for aluminum. However, other materials have variations in the coefficients of thermal expansion for the different axes. In some plate materials such as polyester, expansion can occur in a non-linear manner with maximum expansion along the diagonal axes of the plate due to moisture absorption. It will be understood that such different properties can be considered when programming the control unit, whether the condition is easily predictable or experimentally measured under varying conditions and recorded in the "look-up" table. Further, whether the changes in size, shape, and exposure sensitivity are uniform or otherwise in response to changes in the temperature, humidity, or both, the memory of the control unit can be programmed to adjust the modulation frequency and exposure level of the exposure source according to the sensed condition in the output device. When multiple condition sensitive characteristics of a material are affected by changes in the ambient conditions, the compensation can be superimposed by the control unit or measured and recorded simultaneously to compensate for variations.

While this invention has been described in terms of a preferred embodiment, those skilled in the art will appreciate that various modifications, substitutions, omissions and changes may be made without departing from the spirit thereof. Accordingly, it is intended that the scope of the present invention be limited solely by the scope of the following claims, including equivalents thereof.

I claim:

1. A method for producing an image on a receiving material, comprising the steps of:
    (a) sensing a condition of an image receiving material on which an image is to be formed by an imaging beam;
    (b) adjusting the imaging beam according to the sensed condition of the image receiving material to compensate for a change in a condition sensitive characteristic of the image receiving material due to a difference between the sensed condition and a reference condition of the image receiving material; and
    (c) forming the image on the image receiving material with the adjusted imaging beam.

2. The method according to claim 1, wherein:
    said step of forming the image on the image receiving material includes scanning the adjusted imaging beam on the image receiving material while modulating the adjusted imaging beam according to image data representing the image; and
    the step of adjusting the imaging beam includes adjusting the exposure level of the imaging beam according to the sensed condition of the image receiving material to compensate for the change in the condition sensitive characteristic of the image receiving material.

3. The method according to claim 1, wherein:
    said step of forming the image on the image receiving material includes scanning the adjusted imaging beam on the image receiving material while modulating the adjusted imaging beam according to image data representing the image; and
    the step of adjusting the imaging beam includes adjusting the modulation frequency of the imaging beam according to the sensed condition of the image receiving material to compensate for the change in the condition sensitive characteristic of the image receiving material.

4. The method according to claim 1, wherein the sensed condition is temperature and the condition sensitive characteristic is geometric size of the image receiving material.

5. The method according to claim 1, wherein the sensed condition is temperature and the condition sensitive characteristic is exposure sensitivity of the image receiving material.

6. The method according to claim 1, wherein the sensed condition is humidity and the condition sensitive characteristic is geometric size of the image receiving material.

7. The method according to claim 1, wherein the sensed condition is humidity and the condition sensitive characteristic is exposure sensitivity of the image receiving material.

8. A method for producing an image on an image receiving material, comprising the steps of:
    (a) sensing a temperature of an image receiving material on which an image is to be formed with an imaging beam;
    (b) determining a size of said image to be formed on the image receiving material according to a coefficient of thermal expansion of said image receiving material and the sensed temperature;
    (c) adjusting the imaging beam to correspond to said size; and
    (d) forming said image on said image receiving material with the adjusted imaging beam.

9. The method according to claim 8, further comprising the step of repeating said steps to produce the image on multiple sheets of the image receiving material, each of said multiple sheets being of substantially the same size and having a substantially equal temperature, such that the image produced on each of said multiple sheets is of uniform size.

10. An apparatus for producing an image on a receiving material, comprising:
    a sensor for sensing a condition of an image receiving material on which an image is to be formed;
    an imaging device for exposing the image receiving material to form the image thereon;
    a controller for controlling the imaging device according to the sensed condition of the image receiving material to compensate for a change in a condition sensitive characteristic of the image receiving material due to a difference between the sensed condition and a reference condition of the image receiving material such that the image formed on the image receiving material corresponds to the changed condition sensitive characteristic of the image receiving material.

11. The apparatus according to claim 10, wherein:
    the sensed condition is a sensed temperature, the reference condition is a reference temperature and the condition sensitive characteristic is exposure sensitivity,
    said imaging device includes a scanner for scanning an imaging beam on the image receiving material while modulating the imaging beam according to image data representing the image, and
    said controller controls the imaging device to adjust the exposure level of the imaging beam according to the sensed temperature of the image receiving material to compensate for the change in the exposure sensitivity of the image receiving material due to the difference between the sensed temperature and the reference temperature of the image receiving material.

12. The apparatus according to claim 10, wherein:
    the sensed condition is a sensed temperature, the reference condition is a reference temperature and the condition sensitive characteristic is geometric size,
    said imaging device includes a scanner for scanning an imaging beam on the image receiving material while modulating the imaging beam according to image data representing the image, and
    said controller controls the imaging device to adjust the modulation frequency of the imaging beam according to the sensed temperature of the image receiving material to compensate for the change in the geometric size of the image receiving material due to the difference between the sensed temperature and the reference temperature of the image receiving material.

13. The apparatus according to claim 10, wherein the sensed condition is temperature and the condition sensitive characteristic is geometric size of the image receiving material.

14. The apparatus according to claim 10, wherein the sensed condition is temperature and the condition sensitive characteristic is exposure sensitivity of the image receiving material.

15. The apparatus according to claim 10, wherein the sensed condition is humidity and the condition sensitive characteristic is geometric size of the image receiving material.

16. The apparatus according to claim 10, wherein the sensed condition is humidity and the condition sensitive characteristic is exposure sensitivity of the image receiving material.

17. An apparatus for producing an image on an image receiving material from a digital image, comprising:
 (a) sensing means for sensing a temperature of the receiving material on which the image is to be formed;
 (b) means for determining a temperature dependent size for said digital image according to a coefficient of thermal expansion of said image receiving material and the temperature sensed by said sensing means;
 (c) means for adjusting the digital image to correspond to said temperature dependent size; and
 (d) means for forming the image on the receiving material in accordance with the adjusted digital image.

18. The apparatus according to claim 10, wherein:
 the sensed condition is a sensed temperature, the reference condition is a reference temperature and the condition sensitive characteristic is geometric size,
 said imaging device includes scanning means for scanning an imaging beam on the image receiving material while modulating the imaging beam according to image data representing the image, and
 said controller controls the scanning means so as to adjust the scanning speed of the imaging beam according to the sensed temperature of the image receiving material to compensate for a change in the geometric size of the image receiving material due to the difference between the sensed temperature and the reference temperature of the image receiving material.

19. The method according to claim 1, wherein said step of forming image on the image receiving material includes:
 (a) scanning the imaging beam on the image receiving material while modulating the imaging beam according to digital image data representing the image; and
 (b) adjusting a scanning speed of the imaging beam according to the sensed condition of the image receiving material to compensate for the change in the condition sensitive characteristic of the image receiving material.

20. The method according to claim 1, wherein said step of forming the image on the image receiving material includes:
 (a) scanning the imaging beam on the image receiving material while modulating the imaging beam according to digital image data representing the image; and
 (b) adjusting a modulation frequency and a scan speed of the imaging beam according to the sensed condition of the image receiving material to compensate for the change in the condition sensitive characteristic of the image receiving material.

21. A method for producing an image on a receiving material, comprising the steps of:
 (a) sensing a condition effecting a condition sensitive characteristics of an image receiving material on which an image is to be formed by an imaging beam;
 (b) adjusting only the imaging beam according to the sensed condition to compensate for a change in the condition sensitive characteristic of the image receiving material due to a difference between the sensed condition and a reference condition; and
 (c) forming the image on the image receiving material with the adjusted imaging beam.

22. The method according to claim 21, wherein:
 said step of forming the image on the image receiving material includes scanning the adjusted imaging beam on the image receiving material while modulating the adjusted imaging beam according to the image data representing the image; and
 the step of adjusting the imaging beam includes adjusting the exposure level of the imaging beam according to the sensed condition of the image receiving material to compensate for the change in the condition sensitive characteristic of the image receiving material.

23. The method according to claim 21, wherein:
 said step of forming the image on the image receiving material includes scanning the adjusted imaging beam on the image receiving material while modulating the adjusted imaging beam according to image data representing the image; and
 the step of adjusting the imaging beam includes adjusting the modulation frequency of the imaging beam according to the sensed condition of the image receiving material to compensate for the change in the condition sensitive characteristic of the image receiving material.

24. The method according to claim 21, wherein the sensed condition is temperature.

25. The method according to claim 24, wherein the condition sensitive characteristic is one of exposure sensitivity of the image receiving material and geometric size of the image receiving material.

26. The method according to claim 21, wherein the condition sensitive characteristic is geometric size of the image receiving material.

27. The method according to claim 21, wherein the sensed condition is humidity and the condition sensitive characteristic is geometric size of the image receiving material.

28. The method according to claim 21, wherein the step of adjusting the imaging beam includes adjusting the imaging beam to one of a plurality of settings greater than two to compensate for the change in the condition sensitive characteristic of the image receiving material.

29. An apparatus for producing an image on a receiving material, comprising:
 a sensor for sensing a condition effecting a condition sensitive characteristic of an image receiving material on which an image is to be formed;
 an imaging device for exposing the image receiving material with an imaging beam to form the image thereon;
 a controller for controlling the imaging device to adjust only the imaging beam according to the sensed condition to compensate for the change in the condition sensitive characteristic of the image receiving material due to a difference between the sensed condition and a reference condition such that the image formed on the image receiving material corresponds to the changed condition sensitive characteristic of the image receiving material.

30. The apparatus according to claim 29, wherein the sensed condition is temperature.

31. The apparatus according to claim 29, wherein the condition sensitive characteristic is one of exposure sensitivity of the image receiving material and geometric size of the image receiving material.

32. The apparatus according to claim 29, wherein the condition sensitive characteristic is geometric size of the image receiving material.

33. The apparatus according to claim 29, wherein the sensed condition is humidity and the condition sensitive characteristic is geometric size of the image receiving material.

34. The apparatus according to claim 29, wherein the controller is configured to control the imaging device so as to adjust the imaging beam to one of a number of settings, the number being greater than two, to compensate for the change in the condition sensitive characteristic of the image receiving material.

35. An apparatus for producing an image on a receiving material, comprising:

a sensor for sensing a condition effecting a geometric size of an image receiving material on which an image is to be formed;

an imaging device for exposing the image receiving material with an imaging beam to form the image thereon;

a controller for controlling the imaging device according to the sensed condition to compensate for the change in the geometric size of the image receiving material due to a difference between the sensed condition and a reference condition such that the image formed on the image receiving material corresponds to the changed geometric size of the image receiving material.

36. The apparatus according to claim 35, wherein the sensed condition is one of a temperature and a humidity.

* * * * *